June 21, 1949.                S. P. PARKER                2,473,607
                                BELTING
                        Filed Sept. 27, 1946

INVENTOR
SAMUEL P. PARKER
BY: Penrose Edmonds Morton Barrows
ATTORNEYS

Patented June 21, 1949

2,473,607

UNITED STATES PATENT OFFICE 2,473,607

BELTING

Samuel P. Parker, La Grange, Ga., assignor, by mesne assignments, to Callaway Mills Company, La Grange, Ga., a corporation of Georgia Application September 27, 1946, Serial No. 699,843

4 Claims. (Cl. 139—419)

This invention relates to reinforcing material for use in the production of belting employed for conveying and power transmitting purposes and ordinarily made of a number of layers or plies of fabric impregnated with a rubber compound and then laid face to face to form an assembly, which is then coated with the compound. More particularly, the invention is concerned with a novel fabric for use in reinforced belting, which is superior to the fabrics heretofore used in numerous respects. The new fabric has substantially greater longitudinal strength than prior fabrics of the same weight, so that its use reduces the cost of manufacture of the belting. In addition, the new fabric may be employed in the construction of belting which, although of great strength longitudinally, is readily flexible about its longitudinal axis, so that it is highly desirable for use in conveying systems, in which the belting carries the load on its upper stretch and that stretch is maintained in trough shape by suitable supporting rolls.

Reinforced rubber belting as now commonly made includes a plurality of layers of heavy dense square-woven fabrics, such as cotton duck, in which the filling yarns pass alternately over and under adjacent warp yarns across the material and are tightly beaten up. In the production of the belting, the layers are ordinarily cut from lengths of fabric, so that one or both edges of each layer are raw, and the layers are then individually impregnated with a rubber compound by being passed through a friction calender. Usually each layer is passed twice through the calender so that the rubber is applied to both faces and forced into and through the interstices of the fabric. The desired number of impregnated layers are then laid face to face and thicker coatings of rubber are frictioned on both faces of the assembly, after which the rubber is vulcanized as, for example, by placing the material between heated platens. As the individual layers must be impregnated in separate operations prior to assembling the layers and coating the assembly, it will be apparent that the cost of manufacture of such belting is high, because of the numerous operations required. Also, the cost increases directly with an increase in the number of layers and thus directly with an increase in the longitudinal strength of the belting.

Aside from its cost, rubber reinforced belting of the multi-ply construction described is subject to the objection that its stiffness and resistance to bending about its longitudinal axis increases with its longitudinal strength. In conveying systems, in which belts are employed to carry loose material, such as rock or ore, the upper stretch of the belt is ordinarily maintained in trough form, so that the material will ride properly and not fall off. Prior belting of heavy gauge and great longitudinal strength, as employed in long conveying systems, is so resistant to flexing about its longitudinal axis that it does not readily assume trough shape and, when it is bent to trough form, internal stresses are set up within the belting, which in time cause injury to the fabric layers.

The present invention is directed to the provision of a novel reinforcement for belting of the type described, which is not subject to the disadvantages of the prior reinforcing materials. The new reinforcement makes it possible to use less plies of reinforcing material than heretofore required, and, for many purposes, a single ply of the new material may be employed in place of a plurality of plies of the prior material. In addition, the new reinforcement may have any desired longitudinal strength within a wide range, and it may be constructed to be readily flexible about its longitudinal axis without impairment of its longitudinal strength.

The new reinforcement is made up of a plurality of longitudinal cables, each consisting of a plurality of strands of fibrous textile material, which are twisted together with the strands of adjacent cables preferably having opposite twists. The cables are connected together by cross strands which pass between the strands of the individual cables so that, at each such point of crossing, part of the cable strands lie above and part below the cross strands. The cross strands are made of fibrous textile material and are substantially smaller than the cables and usually of about the same size as or smaller than the strands of the cables. The cross strands serve to hold the cables in place and are relatively few in number. Because of that and of their small size, the cross strands impart little stiffness to the belting against flexing about its longitudinal axis. The cables, which give the reinforcement its longitudinal strength, may be made large and strong and any variation in the longitudinal strength of the fabric need not result in any change in its transverse flexibility.

For a better understanding of the invention, reference may be made to the accompanying drawing, in which Fig. 1 is a plan view of a piece of the new reinforcement;

Figure 2:
Fig. 2 is a longitudinal section through the material shown in Fig. 1.
Figure 1:
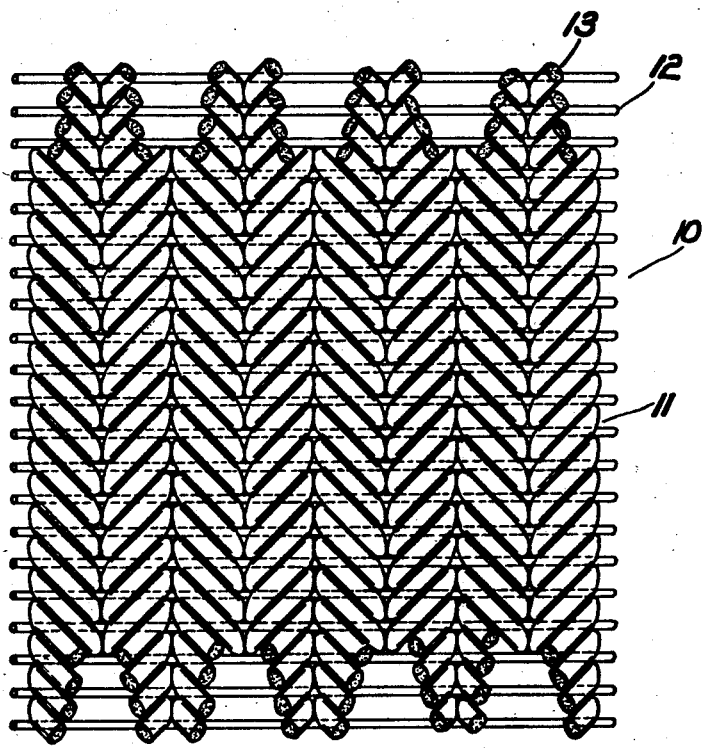

The reinforcement, generally designated 10, is made up of longitudinal cables 11 and cross or filling strands 12. The cables are composed of a plurality of strands 13 of fibrous textile material, such as cotton, as are ordinarily the cross strands, and the cable strands may be made of heavy yarns, although, preferably, each cable strand is a cord formed of a number of yarns twisted together. In the construction illustrated, each cable consists of four such cords twisted together and, in adjacent cables across the reinforcement, the cords are twisted together with opposite twists. This insures that the reinforcement will lie flat and have no tendency to curl.

In the production of the reinforcement, the cable strands are manipulated by rotary devices to form sheds into which the cross or filling strands are inserted, and the insertion of the filling may be accomplished by means of a shuttle so that the material contains a continuous filling strand going back and forth across the material from edge to edge. In each shed, part of the strands of each cable lies in the upper level of the shed and part in the lower, and the cable strands are twisted together between successive sheds, so that each cross strand is bound firmly in place. As a result of the manner in which the cross strands are inserted, they lie between the planes of the upper and lower faces of the reinforcement. While adjacent cables may lie in close contact, they may be separated somewhat, if desired. Also, the number of strands in each cable may be varied as desired. With a four-strand cable, two strands pass over each cross strand at each point of crossing, and two cable strands pass beneath. Between adjacent cross strands, two of the cable strands reverse their positions while the others do not. As a result of this method of handling the cable strands, the adjacent cross strands are separated by cable strands twisted together.

A major advantage afforded by the new reinforcing material is the possibility of utilizing a single layer of the material in the belting to take the place of a plurality of plies of the duck heretofore used. A belting made with a single ply of the new reinforcement may be readily bent to trough form, because the reinforcement contains a comparatively small number of cross or filling strands and these strands are of relatively small size. The use of a single ply of the reinforcement greatly reduces the cost of the belting, because of the fewer operations required for impregnating and coating the material.

I have found that the form of the new material best adapted for use in belting manufacture is one in which the unit size of the cables, expressed in the cotton count, lies between about 0.05 and about 0.5, the total weight of the cross strands varies between one-fourth and three-fourths of the total weight of the cables, and the twist of the strands in the cables is determined by the following formula $$T = K\left(\frac{.95n}{p}\right)^{.71}$$

in which

T = the turns of twist per inch, n = the unit size of the cable strands expressed in the cotton count, p = the number of cable strands in each cable, and K = a constant lying between about 4.6 and about 10.5.

If the unit size of the cables is substantially larger than 0.05, the production of the material requires the use of a loom of heavy, costly construction, which is expensive to maintain and operate, must be operated at relatively low speed, and requires much floor space for the yarn supplies. Materials, in which the unit size of the cables varies between 0.05 and 0.5, can all be readily made on the same loom and the loom is of relatively light construction and can be operated at higher speed than one required for the production of material containing cables of a larger size than 0.05. A reinforcement containing cables, of which the unit size is about 0.05 is suitable for use in the form of a single ply in belting for most heavy duty purposes. I prefer not to make the material with cables of a unit size less than about 0.5, because a material containing cables of a unit size of about 0.5 is about the lightest that would be satisfactory in the form of a single ply as a reinforcement for belting.

In the production of the material, it may be made without difficulty in widths differing from one another by the diameter of a single cable and will ordinarily be of a width of not less than three inches. The reinforcement may, accordingly, have a selvage along both edges and belting made by the use of the reinforcement does not wear rapidly along the edges, as is true in the case of present belting in which the duck layers usually have raw edges. Even if the new reinforcement were cut to width, the edges would be formed by the cables, which would effectively withstand wear.

I have found that, by limiting the total weight of the cross strands in the material to a value between about one-fourth and about three-fourths of the total weight of the cables, the material has such flexibility about its longitudinal axis, as is desirable when it is to be used under conditions requiring it to be bent to trough form. In the material, the cross strands merely anchor the cables together and the cables provide the longitudinal strength. It is, therefore, desirable to make the cables heavy, so that the reinforcement may have maximum longitudinal strength and the cross strands light, so that the final belting will bend readily about its longitudinal axis. By limiting the weight of the cross strands in relation to the weight of the cables within the range specified, the reinforcement has the desired strength, both longitudinally and laterally, and the desired flexibility.

As is evident from the formula for determining the twist of the strands in the cables, the actual number of turns per inch in the twist varies directly with the constant employed in the formula. I have found that, if the twist in the cables is much below the value determined by the formula with a constant of about 4.6, the cable strands are not sufficiently tightly wrapped about one another to produce a material of the desired firmness and longitudinal strength. On the other hand, if the twist is substantially greater than that determined by the formula with a constant of about 10.5, the cable strands are so tightly twisted together that it is hard to beat up the filling strands in the production of the material. Ordinarily, the constant used in the formula will decrease within the limits specified, as the unit size of the cables increases.

The following are specifications of two reinforcements made in accordance with the invention and suitable for belting purposes.

Example I

The fabric was woven on a loom having a 32" reed and was of the following description. Each cable consisted of four strands of cotton yarn, each strand being made up of six ends of 6.75s singles yarn; the unit size of the cables was 0.26; and there were eight of these cables, or thirty-two cable strands, per inch. Each cross strand consisted of six ends of 6.75s singles cotton yarn and there were twelve picks per inch, so that the total weight of the cross strands in the fabric amounted to about 38% of the total weight of the cables. The twist in the cables was three turns per inch.

Example II

The fabric was woven on a machine having a 32" reed and was of the following description. Each cable consisted of four strands of cotton yarn, each strand being made up of ten ends of 4s singles yarn; the unit size of the cables was 0.097; and there were six of these cables, or twenty-four cable strands per inch. Each cross strand consisted of ten ends of 4s singles yarn twisted together and there were six picks per inch, so that the total weight of the cross strands in the fabric amounted to 25% of the total weight of the cables. The twist in the cables was one and one-half turns per inch.

In the new reinforcement, the direction of twist of the cable strands may be the same throughout the length of the material or the twist may reverse periodically. Such reversal in the twist makes no appreciable difference in the longitudinal strength of the material and affords advantages in manufacture.

Figure 4:
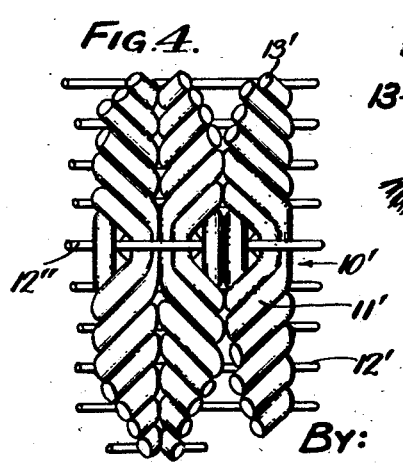
Figure 4 is a plan view of a piece of the new reinforcement in which the direction of twist of the cable strands is periodically reversed.
Figure 3:
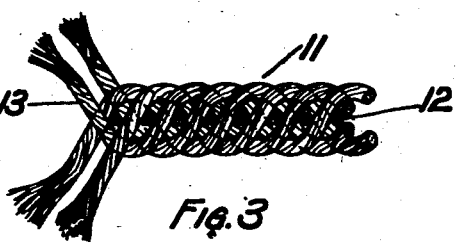
Fig. 3 is a view similar to Fig. 2 and showing the manner in which the cable strands are manipulated during the production of the reinforcement.

A reinforcement 10' is shown in Figure 4 in which the direction of twist of the longitudinal cable strands 11' is reversed each time the strands 13' pass one of the cross strands 12" of the series of cross strands 12'.

In a test of a material embodying the invention and fulfilling the requirements above set forth, I found that the longitudinal strength of the material was nearly 50% greater than that of a standard square-woven duck of approximately the same weight. As the new material may readily be made in weights much greater than the heaviest weights of duck that can be woven, it will be evident why a single ply of the new material may be used in belting to replace a plurality of plies of duck.

I claim:

1. A fabric for use as a reinforcement in belting which comprises a plurality of cables lying side by side and extending lengthwise of the fabric, each cable consisting of a plurality of strands of fibrous textile material twisted together, and cross strands passing between the strands of the individual cables and holding the cables together, the total weight of the cross strands lying between about one-fourth and about three-fourths of the total weight of the cables, the cable twist of the strands in the cables being defined by the formula $$T = K\left(\frac{.95n}{p}\right)^{.71}$$

in which

T = turns of twist per inch
n = unit size of the cable strands expressed in the cotton count
p = number of cable strands in each cable, and
K = a constant lying between about 4.6 and about 10.5.

2. A fabric for use as a reinforcement in belting which comprises a plurality of cables lying side by side and extending lengthwise, of the fabric, each cable consisting of a plurality of strands of fibrous textile material twisted together and the unit size of the cables expressed in the cotton count varying between about 0.05 and about 0.5, and cross strands passing between the strands of the individual cables and holding the cables together, the total weight of the cross strands lying between about one-fourth and three-fourths of the total weight of the cables, the cable twist of the strands in the cables being defined by the formula $$T = K\left(\frac{.95n}{p}\right)^{.71}$$

in which

T = turns of twist per inch
n = unit size of the cable strands expressed in the cotton count
p = number of cable strands in each cable, and
K = a constant lying between about 4.6 and about 10.5.

3. A fabric for use as a reinforcement in belting which comprises a plurality of cables lying side by side and extending lengthwise of the fabric, each cable consisting of a plurality of strands of fibrous textile material twisted together, the twist in the cables being periodically reversed, and cross strands passing between the strands of the individual cables and holding the cables together, the cable twist of the strands in the cables being defined by the formula $$T = K\left(\frac{.95n}{p}\right)^{.71}$$

in which

T = turns of twist per inch
n = unit size of the cable strands expressed in the cotton count
p = number of cable strands in each cable, and
K = a constant lying between about 4.6 and about 10.5.

4. A fabric for use as a reinforcement in belting which comprises a plurality of cables lying side by side and extending lengthwise of the fabric, each cable consisting of a plurality of strands of fibrous textile material twisted together, the strands in adjacent cables across the the fabric being oppositely twisted, and cross strands passing between the strands of the individual cables and holding the cables together, the total weight of the cross strands lying between about one-fourth and three-fourths of the total weight of the cables, the cable twist of the strands in the cables being defined by the formula $$T = K\left(\frac{.95n}{p}\right)^{.71}$$

in which

T = turns of twist per inch
n = unit size of the cable strands expressed in the cotton count
p = number of cable strands in each cable, and
K = a constant lying between about 4.6 and about 10.5.

SAMUEL P. PARKER.

REFERENCES CITED

The following references are of record in the file of this patent:

UNITED STATES PATENTS

| Number | Name | Date |
|---|---|---|
| 2,356,964 | Alderfer | Aug. 29, 1944 |

FOREIGN PATENTS

| Number | Country | Date |
|---|---|---|
| 16,159 | Great Britain | 1915 |